Patented Mar. 13, 1951

2,544,748

UNITED STATES PATENT OFFICE 2,544,748

PRODUCTION OF POTASSIUM CARBONATE

Karl Büchner, Duisburg-Hamborn, Germany

No Drawing. Application July 6, 1950, Serial No. 172,387. In Germany December 6, 1948

5 Claims. (Cl. 23—63)

This invention relates to new and useful improvements in the production of potassium carbonate.

Current practices for the production of potassium carbonate involve electrolysis of potassium chloride while injecting carbon dioxide into the cathode room and also by way of the potassium formiate from potassium sulphate with the aid of lime and water gas. A formerly practiced method for the production of potassium carbonate comprised treatment of potassium chloride with magnesium carbonate trihydrate (Engel's salt). The latter method is not practiced any more. On the other hand, the electrolysis of potassium chloride yields a chlorine containing potash while in the practice of the formiate method, potassium sulphate is required as the starting material, being relatively expensive and difficultly procurable and requiring wash removal of its chlorine content down to about 0.1%.

The present method uses as the starting material the relatively easily procurable potassium chloride, which is reacted with calcium potassium sulphate double salt, such as Syngenit, and carbon dioxide in the presence of ammonia, to thereby form a mixture of calcium carbonate and potassium sulphate. The chlorine of the potassium chloride is recovered in the form of the ammonium chloride solution from which the ammonia may be in turn recovered in the conventional manner with lime under formation of a calcium chloride end liquor. For the purpose of removing the adhering ammonium chloride solution it is necessary to wash the reaction product in such a manner that potassium sulphate will remain in the residue. A concentrated ammonium solution is particularly suitable for this purpose inasmuch as potassium sulphate is only difficultly soluble therein. Within the preferred embodiment of the invention the calcium potassium sulphate double salt used in the reaction is advantageously one obtained in a further step of the method as it may be practiced in accordance with the invention.

The calcium carbonate potassium sulphate mixture from which ammonium chloride has been first completely removed is then freed by evaporation from ammonia. Potassium sulphate preferably derived from the concentration of the potassium carbonate solution is then added to the thusly treated mix, the resulting product being thereafter treated with carbon dioxide at a pressure of about 30 atmospheres in excess of atmospheric and an initial temperature of at least 40° C.

The treatment of a calcium carbonate potassium sulphate mixture with carbon dioxide under pressure has already been previously proposed. In this process, however, normal or below normal temperatures are used. It has now been discovered that it is possible to obtain more compact and more easily filterable Syngenit-precipitates if the initial temperature of the bicarbonate formation reaction is above 40° C. When proceeding in this manner a sample taken from the bicarbonate reaction vessel after about half an hour shows an alkalinity of about 0.5 n. Cooling is then effected down to about room temperature while stirring and maintaining the carbon dioxide pressure substantially between 25 and 30 atmospheres in excess of atmospheric, there being then observed after a period of about 6-8 hours an alkalinity of about 0.9-1.1 n. which corresponds to a potassium carbonate content of about 90-110 g./l. The bicarbonate solution is thereafter separated from the Syngenit residue and preferably while maintaining some pressure, whereupon the residue is washed with cold water.

The bicarbonate solution is then admixed with caustic lime, whereupon the sediment of calcium carbonate is separated by filtration. The potash solution is then concentrated by evaporation to about $\frac{1}{10}$ of its volume. Dissolved potassium sulphate will then precipitate, leaving only a negligible residue in solution. The concentrated potash solution is then evaporated to substantially complete dryness. In this manner a potash of about 96-98% purity is obtained, containing about 0.3% $SO_4$. The chlorine content varies somewhat with the extent of the potassium sulphate wash removal, but may be maintained at 0.1% and less.

Inasmuch as the bicarbonate reaction at or above 40° C. may attack the iron of the equipment and may participate in the reaction it is necessary that this step in the conversion be carried out in a carbon-dioxide-proof equipment.

The following example is furnished by illustration but not of limitation:

Example

A tube of about 20 litres contents and being substantially pressure and corrosion proof is mounted rotatable with respect to its transverse axis. The tube is charged with about 765 g. potassium chloride (98%) and a mixture of 1645 g. $CaSO_4K_2SO_4H_2O$ (Syngenit) 500 g. $CaCO_3$, 150 g. $K_2SO_4$ and 2000 g. adhering water, all preferably obtained in the course of the practice of the process, as well as 550 g. potassium sulphate and 30 g. calcium carbonate dissolved in 2135 g. of water. 170 g. of ammonia and 250 g. of carbon dioxide are introduced into the tube, the latter being rotated back and forth through substantially as semi-circle around its transverse axis. 1250 g. of ammonia are then passed into the tube, which is also provided with a filter candle, the liquid being pressed out of the tube through the candle. The residue is then washed with a solution of 680 g. ammonia in 2020 g. water, remnant ammonia being thereafter removed by evaporation. The evaporated ammonia and the wash solution are returned to the mother liquor. There is then obtained a solution of about 535 g. ammonium chloride, 1930 g. ammonia, 15 g. sodium chloride and 10 g. potassium sulphate in about 6120 g. water. This solution is boiled with 320 g. calcium hydroxide and will then yield 2100 g. recovered ammonia. The end liquor contains a solution of about 550 g. calcium chloride, 15 g. sodium chloride, 10 g. potassium sulphate in 4600 g. of water.

The washed residue of 1000 g. calcium carbonate, 1890 g. potassium sulphate and 400 g. water is then admixed with 550 g. potassium sulphate and preferably reclaimed potassium sulphate together with 30 g. calcium carbonate, whereupon 9500 g. of water is added. The tube is then placed under carbon dioxide pressure of about 30 kg./cm.² at a temperature of about 40° C. The mass is kept in mixing motion at this temperature for about one-half hour and is thereafter cooled by appropriate cooling means applied to the tube and while maintaining the same in substantially continuous motion. The cooling is effected over a period of about six hours down to about room temperature. The liquid is then again pressed through the candle, thus separating the same from the residue. 2000 g. of water are added to the residue yielding approximately 10 litres of a solution containing about 1000 g. potassium carbonate, 550 g. potassium sulphate, 30 g. calcium carbonate in the form of its bicarbonate and 9540 g. of water. This solution is then admixed with about 280 g. of quick lime, whereupon the same is filtered after about one and one-half hours to separate the same from the solid residue. In this manner a potash solution is obtained which, upon concentration, yields for recovery about 550 g. of potassium sulphate. Upon evaporating this solution to substantial dryness, about 690 g. of potassium carbonate are obtained.

I claim:

1. Method for the production of potassium carbonate from potassium chloride which comprises reacting potassium chloride in the presence of ammonia and carbon dioxide with a calcium potassium sulphate double salt to thereby obtain a mixture of potassium sulphate and calcium carbonate, reacting said mixture with carbon dioxide to convert the same into potassium bicarbonate and calcium potassium sulphate double salt, and converting said potassium bicarbonate into potassium carbonate.

2. Method in accordance with claim 1 in which said bicarbonate conversion is carried out while maintaining initial temperatures of at least 40° C.

3. Method in accordance with claim 2 in which the pressure during said bicarbonate conversion is maintained at substantially between 25 and 30 atmospheres in excess of atmospheric.

4. In the production of potassium carbonate, the improvement which comprises reacting potassium chloride in the presence of ammonia and carbon dioxide with a calcium potassium sulphate double salt and recovering from the reaction mix potassium sulphate and calcium carbonate.

5. In the production of potassium carbonate, the improvement which comprises reacting a mixture of potassium sulphate and calcium carbonate at a temperature of excess of 40° C. and a pressure between about 25 and 30 atmospheres in excess of atmospheric to thereby convert said mixture into potassium bicarbonate and converting said bicarbonate into potassium carbonate.

KARL BÜCHNER.

No references cited.